(12) United States Patent
Gonzalez et al.

(10) Patent No.: US 12,057,994 B1
(45) Date of Patent: Aug. 6, 2024

(54) TELECOMMUNICATION NETWORK LARGE-SCALE EVENT ROOT CAUSE ANALYSIS

(71) Applicant: T-Mobile Innovations LLC, Overland Park, KS (US)

(72) Inventors: Jose A. Gonzalez, Maitland, FL (US); Brian D. Lushear, Winter Springs, FL (US); Dalton J. Sherley, Olathe, KS (US); Todd M. Szymanski, Winter Park, FL (US); Miguel A. Betancourt Villavicencio, Ocoee, FL (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/352,982

(22) Filed: Jul. 14, 2023

(51) Int. Cl.
*H04L 41/0631* (2022.01)
*H04L 41/0654* (2022.01)

(52) U.S. Cl.
CPC ...... *H04L 41/0645* (2013.01); *H04L 41/0654* (2013.01)

(58) Field of Classification Search
None
See application file for complete search history.

(56) References Cited

U.S. PATENT DOCUMENTS

| | | | |
|---|---|---|---|
| 6,420,968 B1 | 7/2002 | Hirsch | |
| 10,270,796 B1 * | 4/2019 | Veeraswamy | H04L 63/1433 |
| 11,252,052 B1 * | 2/2022 | Babu Balasubramani | H04L 41/0654 |
| 11,432,170 B1 * | 8/2022 | Osinski | H04W 24/02 |
| 11,902,306 B1 * | 2/2024 | Satish | H04L 63/1441 |
| 2007/0198695 A1 | 8/2007 | Engelmann et al. | |
| 2022/0107858 A1 * | 4/2022 | Jain | G06F 11/0751 |

OTHER PUBLICATIONS

Office Action dated Oct. 6, 2023, U.S. Appl. No. 18/308,514, filed Apr. 27, 2023.
Lumpkins, Robert D et al., "Association of Related Incidents to a Telecommunication Network Large-Scale Event," filed Apr. 27, 2023, U.S. Appl. No. 18/308,514.
"Maldonado, Ivan et al., ""Large-Scale Event Detection Using Voronoi Cells,"" filed Sep. 7, 2023, U.S. Appl. No. 18/463,257".
Final Office Action dated Apr. 18, 2024, U.S. Appl. No. 18/308,514, filed Apr. 27, 2023.
"Main Concept Text."Ericsson Technology Review, The IP.com Journal, China.

* cited by examiner

*Primary Examiner* — James A Edwards

(57) ABSTRACT

A telecommunication network management system. The system comprises an incident reporting application that creates incident reports pursuant to alarms on network elements of a telecommunication network and wherein one of the incident reports is associated with a large-scale event (LSE), wherein the LSE incident report identifies alarms at a plurality of different network elements as associated with the LSE; and an incident management application that analyzes attributes of cell sites identified in the LSE incident report as impacted by the LSE, determines that at least 75% of the cell sites receive backhaul service from a same alternative access vendor (AAV) and that at least one backhaul circuit of the at least 75% of the cell sites is in an alarmed state, causes the incident reporting application to record a root cause of the LSE incident report as an AAV fault.

12 Claims, 9 Drawing Sheets

TELECOMMUNICATION NETWORK LARGE-SCALE EVENT ROOT CAUSE ANALYSIS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication network operators build systems and tools to monitor their networks, to identify network elements (NEs) that need maintenance, to assign maintenance tasks to personnel, and to fix network elements. Operational support systems (OSSs) may be provided by vendors of NEs to monitor and maintain their products. When trouble occurs in NEs, the OSS and/or the NEs may generate an alarm notification. An incident reporting system may be provided by the network operator to track incident reports which may be assigned to employees to resolve one or more pending alarms. A network operation center (NOC) may provide a variety of workstations and tools for NOC personnel to monitor alarms, close incident reports, and maintain the network as a whole. It is understood that operating and maintaining a nationwide communication network comprising tens of thousands of cell sites and other NEs is very complicated.

SUMMARY

In an embodiment, a telecommunication network management system is disclosed. The system comprises an incident reporting application executing on a first computer system, wherein the incident reporting application creates incident reports pursuant to alarms on network elements of a telecommunication network and wherein one of the incident reports is associated with a large-scale event (LSE), wherein the LSE incident report identifies alarms at a plurality of different network elements as associated with the LSE. The system also comprises an incident management application that executes on a second computer system, wherein the incident management application analyzes attributes of cell sites identified in the LSE incident report as impacted by the LSE, determines that at least 75% of the cell sites receive backhaul service from a same alternative access vendor (AAV) and that at least one backhaul circuit of the at least 75% of the cell sites is in an alarmed state, causes the incident reporting application to record a root cause of the LSE incident report as an AAV fault, wherein the incident reporting application or the incident management application sends a notification to the AAV to restore their backhaul circuits that are in the alarmed state, wherein the notification identifies cell sites affected by the backhaul circuits in the alarmed state and identifies the backhaul circuits of the AAV in the alarmed state.

In another embodiment, a method of telecommunication network management is disclosed. The method comprises retrieving information about a large-scale event (LSE) by an incident management application executing on a computer system, wherein the LSE is associated with a plurality of cell sites of a telecommunication network that are in an alarmed state, wherein the information about the LSE comprises inventories of equipment at the cell sites, identities of one or more operational support systems (OSSs) that manage the cell sites, identities of one or more electric power service companies that provide electric power to the cell sites, identities of one or more backhaul service providers that provide backhaul circuits to the cell sites, identities of aggregation routers that couple the backhaul circuits to a core of the telecommunication network, information about maintenance activities at the cell sites, and information about alarms associated with the cell sites. The method further comprises analyzing the information about the LSE by the incident management application to identify commonalities among the alarms associated with the cell sites; based on the analyzing, identifying a root cause of the LSE by the incident management application; and sending a message by the incident management application to an incident reporting system identifying the root cause of the LSE, whereby an LSE incident report is assigned by the incident reporting system to a responsible party for resolution of the LSE.

In yet another embodiment, a method of telecommunication network management is disclosed. The method comprises retrieving information about a large-scale event (LSE) by an incident management application executing on a computer system, wherein the LSE is associated with a plurality of cell sites of a telecommunication network that are in an alarmed state, wherein the information about the LSE comprises inventories of equipment at the cell sites retrieved from an inventory data store, maintenance information on cell sites retrieved from a cell site maintenance tracking system, alarms associated with the equipment at the cell sites retrieved from a network operation center (NOC) dashboard. The method further comprises presenting the information about the LSE by the incident management application in a user interface analysis screen showing information about the LSE in an alternate access vendor (AAV) portion of the screen, in an electric power service provider portion of the screen, in an aggregation router portion of the screen, and in a cell site maintenance portion of the screen. The method further comprises analyzing the information about the LSE presented in the user interface analysis screen; based on the analyzing, determining a root cause of the LSE; assigning the root cause to an LSE incident report; appending information collected from the user interface analysis screen to the LSE incident report; and assigning the LSE incident report to a responsible party for resolution of the LSE.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
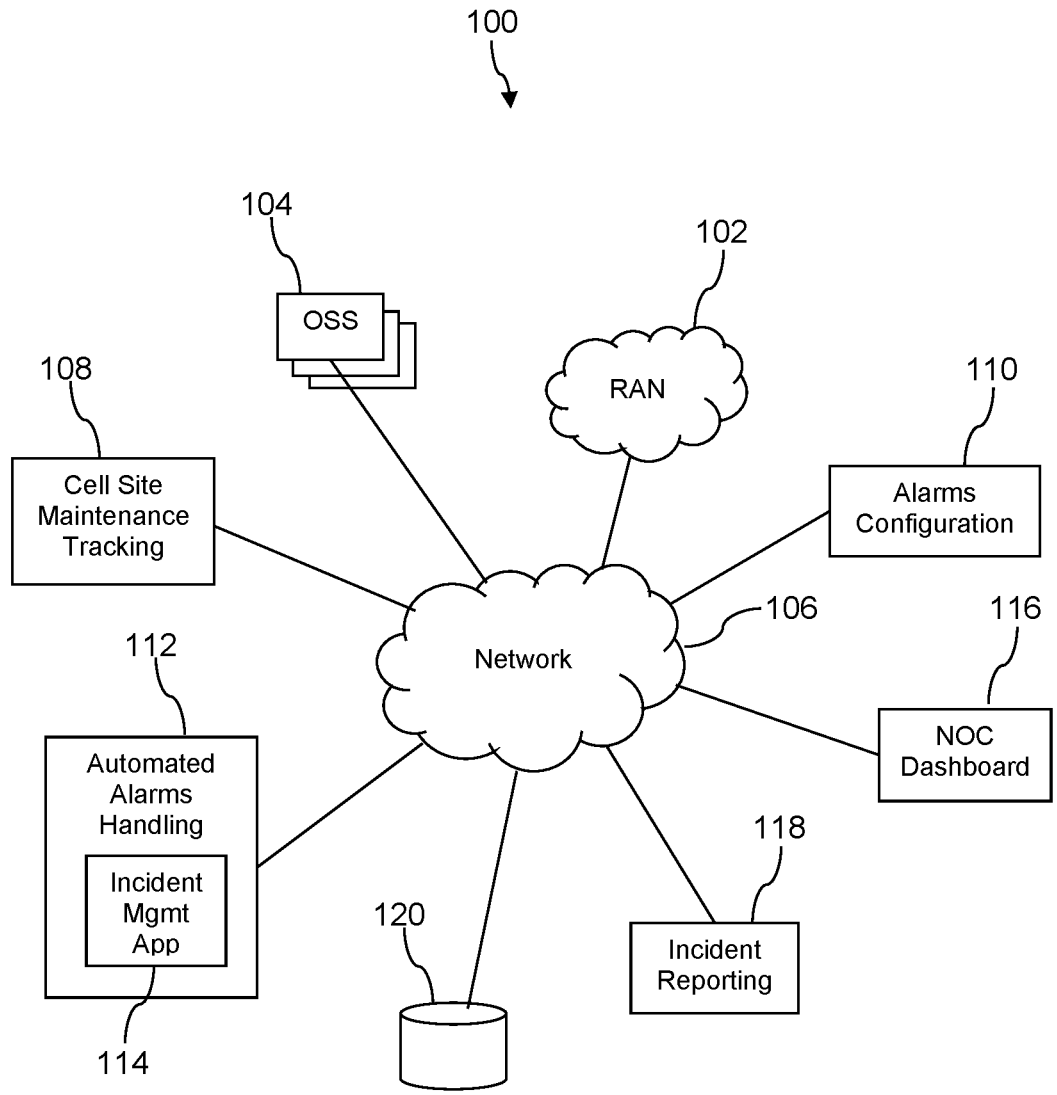
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Network elements (NEs) in a radio access network (RAN)—for example equipment at cell sites, cell site routers, aggregation routers, etc.—may be subject to a variety of faults or failures. These faults and/or failures typically result in raising of alarms by affected NEs, and these alarms are picked up by operational support systems (OSSs) and propagated upwards to a central monitoring station such as a network operation center (NOC). Sometimes different cell sites experience alarms that are traceable to a common cause, such as a severe weather event. It is desirable that such alarms be seen as related to the same event so that they can be resolved in a suitable and often uniform manner. Such an event may be referred to as a large-scale event (LSE). LSEs can be identified by automation such as a computer program or a script executing on a computer. The automation can define a set of rules or criteria that a set of alarms must satisfy to qualify as related to an LSE. This criteria may involve some combination of (A) identical alarms, (B) alarms raised at about the same time (e.g., notified within a predefined time duration, where this predefined time duration may be increased later to accommodate the possibility that a LSE expands as time passes, for example as a storm passes through an area), and (C) alarms being associated with cell sites or other NEs located proximate to each other. When such an LSE is identified by automation, a master incident report can be generated that lists the related alarms, and a unified and/or coordinated process of handling the master incident report associated with the LSE can be launched.

A network management system (NMS) may comprise one or more tools that support a telecommunication network operator keeping its telecommunication network in good working order. As an example, an NMS may comprise one or more OSSs, a network cell site maintenance tracking tool, an incident reporting tool (e.g., a trouble ticket reporting tool), an incident management tool, and a NOC dashboard. The various components of the NMS may interwork with each other to share information about the state of the telecommunication network and to take action to maintain NEs in the telecommunication network.

The present disclosure teaches an incident management tool that, among other functions, analyzes data associated with an LSE, identifies a root cause of the LSE, and interworks with an incident management tool to incorporate this root cause into an associated LSE incident report. Additionally, the incident management tool captures relevant information collected during its analysis of the LSE and promotes ease of incorporating this information into the associated LSE incident report.

In the past, a NOC technician would inspect data collected from cell sites affected by an LSE to try to identify a root cause. This might involve clicking on individual representations of cell sites in a NOC user interface screen, inspecting the current alarms and status of equipment at the given cell site. The NOC technician might click on individual alarmed equipment at the given cell site to drill down for further details. After completing the inspection of one cell site affected by the LSE, the NOC technician might repeat the same process to inspect many other cell sites affected by the same LSE. After this time consuming and labor-intensive process, the NOC technician might then be able to identify the root cause of the LSE. As an example, this process could easily take 45 minutes to an hour to complete and to make a justified identification of a root cause. Then the NOC technician would spend additional time collecting together relevant data to incorporate into the LSE incident report.

By contrast, the incident management tool disclosed herein promotes rapid identification of a root cause of LSEs and ease of collecting relevant data and incorporating the data into the LSE incident report. The incident management tool analyzes large sets of data collected from disparate systems in combination to determine the root cause of the LSE. The data to be analyzed may be selected based on alarms associated with the LSE—for example, selecting data from disparate systems associated with cell sites and NEs that have alarms associated with the LSE. In an embodiment, the results of this analysis can be presented on a display screen and examined by a NOC technician to identify commonalities among the data to readily identify the root cause of the LSE. Alternatively, a computer program or script may automatically identify such commonalities and identify the root cause of the LSE.

In an embodiment, the incident management tool may correlate alarms associated with the LSE to cell site attributes to determine a root cause of the LSE. These cell site attributes comprise one or more of equipment or node type, OSS identities, identities of electric power service companies, identities of alternative access vendors (AAVs) (e.g., backhaul circuit service providers), backhaul type, alarm type (simplex of total site outage), wireless controller (BSC or MSC), aggregation router identity and port, recent or scheduled maintenance, and site status by technology, by cell sector, and by cell site. In an embodiment, the incident management tool may access a comprehensive database of RAN inventory. The RAN inventory may list cell sites and NEs, subcomponents of the cell sites and NEs, and sub-subcomponents of the cell sites and NEs. The RAN inventory can disclose a hierarchy of RAN equipment down to a circuit card level or lower. The RAN inventory can include information on software and/or firmware versions installed on the given articles of inventory.

The incident management tool interworks with one or more OSSs, a network cell site maintenance tracking tool, an incident reporting tool, and a NOC dashboard to collect information relevant to the cell sites affected by an LSE and marshals the data gathered from these disparate sources into a comprehensive and readily understood picture of the affected cell sites. In an embodiment, the incident management tool presents the collected information in an analysis screen which is segmented into (1) an AAV sub-screen providing cell site backhaul information for cell sites affected by the LSE, (2) a backhaul service type sub-screen, (3) an aggregation router sub-screen providing information on aggregation routers associated with cell sites affected by the LSE, (4) an electric power service provider sub-screen providing information on electric power service supplied to cell sites affected by the LSE, (5) a maintenance sub-screen providing information on maintenance operations performed recently on cell sites and/or NEs affected by the LSE, (6) a management OSS sub-screen providing information on OSSs linked to cell sites affected by the LSE, and (7) a controllers sub-screen providing information on controllers linked to cell sites affected by the LSE. In an embodiment, a user screen of sub-screen provides the ability to do a per-technology type analysis to see if a particular cellular technology (e.g., 5G, LTE, CDMA, GSM) at cell sites associated with the LSE are implicated as the root cause.

The user (e.g., a NOC technician) can quickly navigate among the sub-screens of the analysis screen to identify the root cause of the LSE and to select information for incorporating into an LSE incident report with one or more clicks of a control button of the analysis screen. This information can include circuit identities and/or VLAN identities given by the AAVs to its backhaul circuits involved in an LSE. This information can include physical addresses and electric meter identities of the cell site for use by electric power service providers. Without exaggeration, this process using the incident management tool disclosed herein could be completed in less than five minutes, possibly in less than two minutes, by a NOC technician.

In an embodiment, the incident management tool may be enhanced to perform automated root cause analysis and to automatically incorporate relevant data into the LSE incident report. For example, the incident management tool may analyze relevant data and identify a root cause as (1) a failure of an AAV affecting backhaul, (2) a failure of an aggregation router card affecting linkage of a core network to backhaul, (3) a failure of an electric power service provider, (4) a failure due to improperly completed maintenance activity, and/or (5) a general weather event affecting most or all of the cell sites affected by an LSE. In an embodiment, the incident management tool may assign the LSE incident report (or interwork with the incident reporting tool such that the incident reporting tool assigns the incident report) to a party or individual deemed responsible for responding to the LSE, for example assigning an incident report to an electric power service provider that is responsible for restoring electric power service to cell sites affected by the LSE.

The present disclosure teaches a specific technical solution to the technical problem of identifying root causes of LSEs and promptly assigning an associated incident report, along with information relevant to resolving the incident report, to a responsible party. This technical problem arises in the context of operating a complex technology system—a modern telecommunication network comprising tens of thousands of cell sites and associated electronic equipment. The specific technical solution disclosed herein applies sophisticated information technology to support rapid and accurate response to LSEs. It will be appreciated that the incident management tool disclosed herein differs from the former labor intensive analysis by a NOC technician, at least in that the analysis process formerly employed by the NOC technician encourages guessing a root cause of an LSE based on inspection of only a portion of the totality of data related to the LSE, whereby to complete the time consuming process efficiently and rapidly, whereas the incident management tool disclosed herein can analyze all of the data related to the LSE before determining the root cause of the LSE.

Turning now to FIG. 1, a communication system 100 is described. In an embodiment, the communication system 100 comprises a radio access network (RAN) 102, a plurality of operational support systems (OSSs) 104, a network 106, a cell site maintenance tracking system 108, an alarms configuration system 110, an automated alarms handling system 112 that executes an incident management application 114, a network operation center (NOC) dashboard system 116, an incident reporting system 118, and a data store 120.

The RAN 102 comprises a plurality of cell sites and backhaul equipment. In an embodiment, the RAN 102 comprises tens of thousands or even hundreds of thousands of cell sites. The cell sites may comprise electronic equipment and radio equipment including antennas. Cell site radio equipment may comprise radio frequency power amplifiers, radio transceivers, frequency up-converters, frequency down-converters, modulators, and/or demodulators. Cell site electronic equipment may comprise baseband processing circuit cards. Cell sites may comprise electric power distribution and conditioning equipment. Cell sites may comprise electric batteries. The cell sites may be associated with towers or buildings on which the antennas may be mounted. At least some of the cell sites may comprise a cell site router that links the cell site to the network 106 via one or more backhaul circuits. Backhaul circuits may be provided by AAVs. Backhaul circuits may connect the cell sites to the network 106 via aggregation routers. Cell site routers, backhaul circuits, and aggregation routers are discussed further hereinafter with reference to FIG. 2A and FIG. 2B. The cell sites may provide wireless links to user equipment (e.g., mobile phones, smart phones, personal digital assistants, laptop computers, tablet computers, notebook computers, wearable computers, headset computers) according to a 5G, a long-term evolution (LTE), code division multiple access (CDMA), or a global system for mobile communications (GSM) telecommunication protocol. In an embodiment, the OSSs 104 comprises tens or even hundreds of OSSs.

The network 106 comprises one or more public networks, one or more private networks, or a combination thereof. The RAN 102 may from some points of view be considered to be part of the network 106 but is illustrated separately in FIG. 1 to promote improved description of the system 100. In an embodiment, the RAN 102 comprises a 5G RAN and the network 106 comprises a 5G core network. A 5G RAN and 5G core network are described further hereinafter with reference to FIG. 6A and FIG. 6B.

The cell site maintenance tracking system 108 is a system implemented by one or more computers. Computers are discussed further hereinafter. The cell site maintenance tracking system 108 is used to track maintenance activities on network elements (e.g., cell site equipment, routers, gateways, and other network equipment). When a network element (NE) is in maintenance, alarms that may occur on the NE may be suppressed, to avoid unnecessarily opening incident reports related to such alarms that may be generated because of unusual conditions the equipment may undergo pursuant to the maintenance activity. When a maintenance action is completed, maintenance personnel may be expected to check and clear all alarms pending on the subject NE before the end of the time scheduled for the maintenance activity. Sometimes a maintenance action may extend beyond the scheduled maintenance window, pending alarms are no longer suppressed (because the scheduled maintenance window has closed), and incident reports may be generated based on the alarms. This can lead to creation of undesired incident reports. It is preferred that maintenance personnel who cannot complete a maintenance task in the scheduled maintenance interval use the cell site maintenance tracking system 108 to extend the scheduled maintenance interval, whereby alarms do not spuriously result in creation of incident reports.

The alarm configuration system 110 is a system implemented by one or more computers. The alarm configuration system 110 allows users (e.g., NOC personnel) to define rules and instructions for handling alarms, for example rules for automatic processing of alarms by the automated alarms handling system 112. The alarm configuration system 110 may define rules for when an alarm leads to automatic generation of an incident report. The alarm configuration system 110 may define rules for how alarms are automatically cleared. In an embodiment, the alarm configuration system 110 may also define which types of alarms would be logical for the creation of a large-scale event because they could have a common root cause. For example, a fan failure alarm that occurs on multiple NEs within a short period of time may not be considered eligible to be a large-scale event because there is likely not a single root cause (e.g., the concurrence of multiple fan failure alarms is likely a coincidence).

Alarms are flowed up from NEs of the RAN 102 via the OSSs 104 to be stored in the data store 120. The NOC dashboard 116 can access the alarms stored in the data store 120 and provide a list of alarms on a display screen used by NOC personnel. NOC personnel can manually open incident reports on these alarms. The incident reporting system 118 can monitor the alarms stored in the data store 120 and automatically generate incident reports on these alarms based in part on the alarm configurations created and maintained by the alarms configuration system 110. For example, an alarm configuration rule defined by the alarm configuration system 110 may indicate that an incident report is not to be opened related to a specific alarm until the alarm has been active for a predefined period of time, for example for five minutes, for ten minutes, for fifteen minutes, for twenty minutes, for twenty-five minutes, or some other period of time less than two hours. The time criteria for auto-generation of incident reports may be useful to avoid opening and tracking incidents that are automatically resolved by other components of the system 100, as described further herein after. Incident reports may be referred to in some contexts or by other communication service providers as tickets or trouble tickets.

In an embodiment, the incident reporting system 118 can determine that a plurality of alarms are related to a LSE and generate a master incident report that covers the LSE. Alarms that are deemed related to the LSE are documented in the LSE master incident report, and the alarm information stored in the data store 120 may be updated to indicate that these alarms are associated with the LSE and/or with the LSE master incident report. In an embodiment, the incident reporting system 118 may update incident reports documenting alarms that the incident reporting system 118 deem to be associated with an LSE by adding an indication into the incident report linking it to or associating it to the LSE master incident report. These incident reports that are linked to the LSE master incident report may be referred to as child incident reports.

The incident management application 114 may operate upon incident reports in a sequence of processes. In an embodiment, the incident management application 114 may perform automated triage on incident reports that includes automated enrichment of alarms and/or incident reports, automated dispatch to field operations personnel for some incident reports, and automated testing. Automated enrichment may comprise looking-up relevant information from a plurality of disparate sources and attaching this relevant information to the incident report. The looked-up information may comprise local environmental information such as weather reports, rainfall amounts, temperature, wind. The looked-up information may comprise logs of recent maintenance activities at the affected NE.

The automated triage process may involve determining a probable root cause for the incident and adding this to the incident report during the enrichment action. The probable root causes may be categorized as related to electric power, backhaul (e.g., transport), maintenance, environmental, or equipment (e.g., RAN hardware related), but within these general categories it is understood there may be a plurality of more precise probable root causes. The automated triage process can assign an incident report to personnel for handling based on its determination of the probable root cause of the incident report.

In an embodiment, the incident management application 114 may automatically close an incident report when NE status warrants such automated closure. Automated closure may happen because NOC personnel have taken manual corrective action to restore proper function of one or more NEs. Automated closure may happen because the incident management application 114 determines that the incident report was created pursuant to a maintenance action that extended beyond the scheduled maintenance interval and that the scheduled maintenance interval was later extended, but extended after a related incident report had already been generated. The incident management application 114 may perform automated remediation of alarm conditions associated with incident reports. For example, cell sites can be reset to restore operation and clear alarmed conditions. For example, cell sites can be locked and unlocked to restore operation and clear alarmed conditions. For example, cell sites may be resynched with GPS. For example, a software or firmware update may be pushed to cell sites.

The NOC dashboard 116 provides a system that NOC personnel can use to monitor health of a carrier network (e.g., monitor the RAN 102 and at least portions of the network 106), to monitor alarms, to drill down to get more details on alarms and on NE status, to review incident reports, and to take corrective actions to restore NEs to normal operational status. The NOC dashboard 116 may interact with the data store 120, with the cell site maintenance tracking system 108, the OSSs 104, the RAN 102, and other systems. NOC personnel can use the NOC dashboard 116 to manually create incident reports based on alarms reviewed in a user interface of the NOC dashboard 116.

When the incident management application 114 determines that alarms associated with a plurality of proximate cell sites or other NEs were generated at about the same time (e.g., within a predefined time interval, where the predefined time interval may expand over time after an LSE is initially declared) and are located geographically proximate to each other, the incident management application 114 can automatically deem that an LSE is associated with these alarms.

The incident management application 114 can automatically generate a master incident report to cover the LSE and can automatically link the associated alarms to the master incident report. The master incident report will be addressed in a holistic and coordinated manner, rather than each separate alarm related to the LSE being assigned to different incident reports and being handled by different personnel who handle each alarm separately and in an uncoordinated manner. Additionally, properly associating alarms to an LSE contributes to improved reporting to regulatory bodies and tasking responsible third parties and/or vendors with supporting and repairing their equipment.

It is understood that different definitions of an LSE can apply under different circumstances. In an embodiment, an LSE may be defined as the same alarm occurring at about the same time at six or more NEs in proximity to each other. A first NE may be said to be proximate to a second NE if it is within six hops of the second NE. Six "hops" in this context may be a jump from the coverage of a first cell site to the coverage area of a second cell site (first hop), from the coverage of the second cell site to the coverage area of a third cell site (second hop), from the coverage area of the third cell site to the coverage area of a fourth cell site (third hop), from the coverage area of the fourth cell site to the coverage area of a fifth cell site (fourth hop), from the coverage area of the fifth cell site to the coverage area of a sixth cell site (fifth hop), from the coverage area of the sixth cell site to the coverage area of a seventh cell site (sixth hop). Thus, any set of six NEs that have the same alarm raised at about the same time that can be linked to one of the set of six NEs by six hops or less may be deemed an LSE. The total hops of the boundary of the LSE may extend 42 hops—if all the NEs in the LSE are aligned in a line—but need not be.

An LSE identifying algorithm can be used to discover neighboring NEs that have the same alarm raised at about the same time. This can involve checking all NEs within six hops of a given NE in alarm for the same alarm. When another NE that qualifies is found, the algorithm can additionally check all NEs within six hops of the additional NE. This process of expanding the search for NEs having the same alarm within six hops or less of another NE having the subject alarm defines a boundary of the LSE.

A telecommunication service provider may subdivide its network into markets and task personnel to maintain the overall network in market segments. Thus, a first team may be assigned to maintain the network in a first market, a second team may be assigned to maintain the network in a second market, and so forth. A telecommunication service provider may subdivide a network spanning the United States with sixty or more markets. Sometimes LSEs extend across market boundaries. To support the market-directed maintenance of the network, in an embodiment, a separate master incident report may be generated for the same LSE in two or more different markets. Thus, a given LSE may be associated with a first master incident report associated with NEs located in a first market, a second master incident report associated with NEs located in a second market, and a third master incident report associated with NEs located in a third market. It is observed that sometimes LSEs spread across large areas due to a common weather event, such as due to a hurricane, due to a string of tornadoes, or due to freezing rain event.

The incident management application 114 can analyze data related to LSEs obtained from a plurality of sources in the system 100 to determine a root cause of the LSEs. This data may be obtained from the OSSs 104, from the cell site maintenance tracking system 108, from the NOC dashboard 116, from the incident reporting system 118, from the data store 120, and from other sources. This data may be obtained from electric power service providers and from AAVs. The data analyzed by the incident management application 114 may comprise network inventory data, for example comprehensive information about different NEs and components of NEs in the RAN 102 and in the network 106. The inventory data can identify components and sub-components and hierarchical relationships among them. The inventory data can identify make and models as well as revision levels of components and sub-components. The inventory data can identify firmware and software versions associated with the components and sub-components. The inventory data may be stored in the data store 120 or in a different data store.

The data analyzed by the incident management application 114 may comprise information provided by the OSSs 104, for example current state information and parameter values (e.g., key performance indicators and metrics) associated with NEs and components of NEs that are tracked by the OSSs 104. The data analyzed by the incident management application 114 may comprise identities of electric power service providers, identities of cell sites receiving electric power from the electric power service providers, and identifiers used by these electric service providers to identify their points of demarcation. The data analyzed by the incident management application 114 may comprise identities of AAVs, cell site routers served by the AAVs, backhaul circuits provided by the AAVs, the identifiers used by the AAVs to identify their backhaul circuits. The data analyzed by the incident management application 114 may comprise information about wireless controllers (e.g., BSCs and MSCs that are associated with some cellular radio technology types). The data analyzed by the incident management application 114 may comprise information about aggregation routers including status of the aggregation router as a whole, status of circuit cards of the aggregation router, and status of individual communication ports of circuit cards of the aggregation router.

The data analyzed by the incident management application 114 may comprise maintenance information such as completed maintenance activities that were completed relatively recently, for example completed within the last week, completed within the last three days, completed within the last two days, completed within the last day, completed within the last 12 hours, completed within the last 6 hours, or completed in some other period of time less than 6 hours ago. The data analyzed by the incident management application 114 may comprise maintenance information such as on-going maintenance activities. The data analyzed by the incident management application 114 may comprise status information (e.g., active or inactive, working or out-of-service) for cell sites, for antenna sectors of cell sites, and for different cellular technology types of cell sites. The data analyzed by the incident management application 114 may comprise alarm information including alarm type, alarm severity, and on-set time of alarms.

Figure 2A:
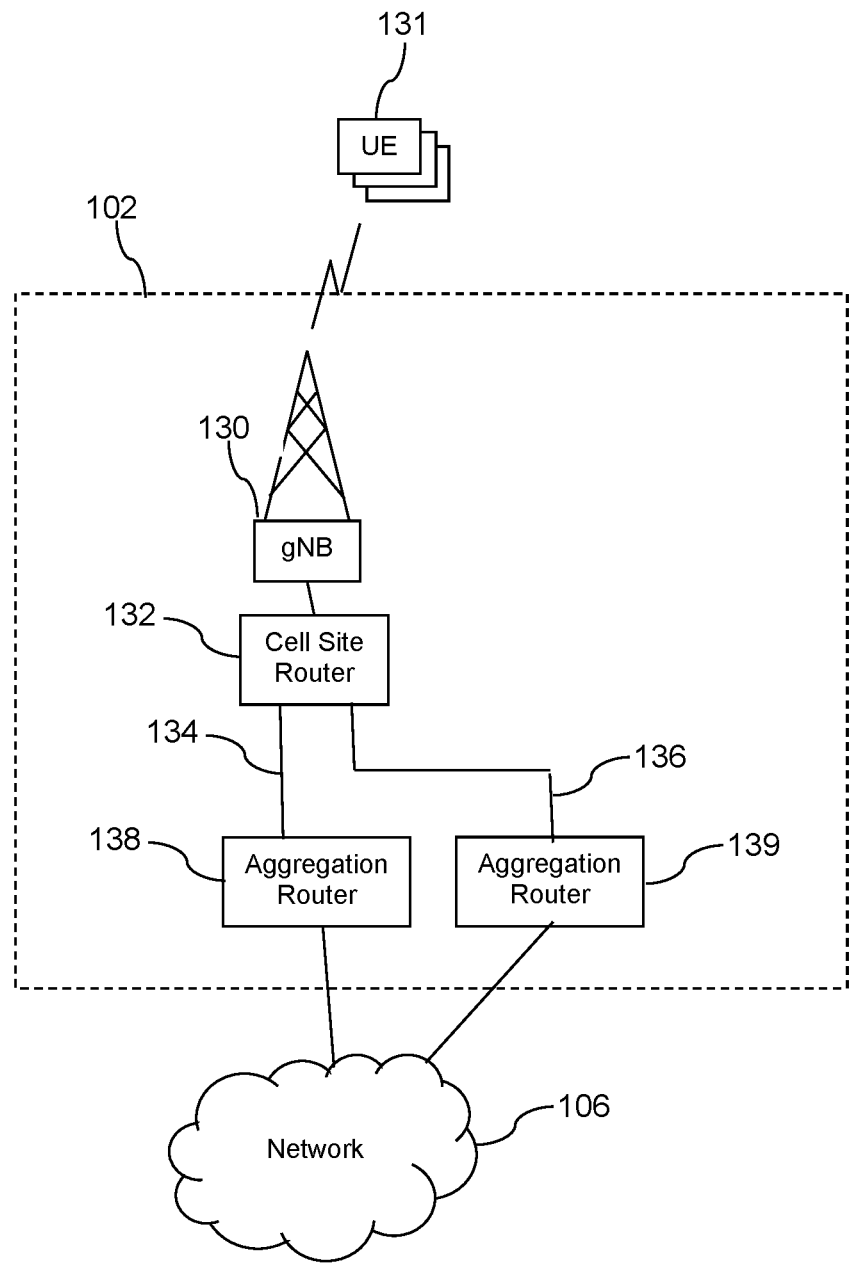
FIG. 2A is a block diagram of a first portion of a radio access network (RAN) according to an embodiment of the disclosure.

Turning now to FIG. 2A, a first backhaul communication link type of the RAN 102 is described. A first cell site 130 associated with a first cell site router 132 is communicatively coupled to the network 106 via the first cell site router 132, via a first backhaul circuit 134, and via a first aggregation router 138. The first cell site 130 is also communicatively coupled to the network 106 via the first cell site router 132, via a second backhaul circuit 136, and via a second aggregation router 139. The first cell site 130 provides a wireless communication link from one or more user equipments (UEs) 131 to the network 106 according to one or more of a 5G, a long-term evolution (LTE), a code division multiple access (CDMA), or a global system for mobile communication (GSM) telecommunication protocol. The UEs 131 may comprise smart phones, wearable computers, laptop computers, tablet computers, notebook computers, desktop computers, and/or Internet of things (IoT) devices.

The cell site router 132 may be physically located proximate to the cell site 130 (e.g., within 20 yards of an equipment house of the cell site 130 or within the equipment house). The actual backhaul facility is provided via the two backhaul circuits 134, 136. Preferably each cell site router is provided with redundant backhaul facilities such that the cell site 130 is not isolated form the network 106 by a single backhaul facility failure. The backhaul circuits are typically provided by an alternate access vendor (AAV). In an embodiment, these backhaul circuits are high bandwidth data links typically provided as Ethernet over fiber at either 1 Gigabit throughput or at 10 Gigabit throughput rates. The aggregation router 138 combines two or more backhaul facilities into a single communication path into the network 106.

Figure 2B:
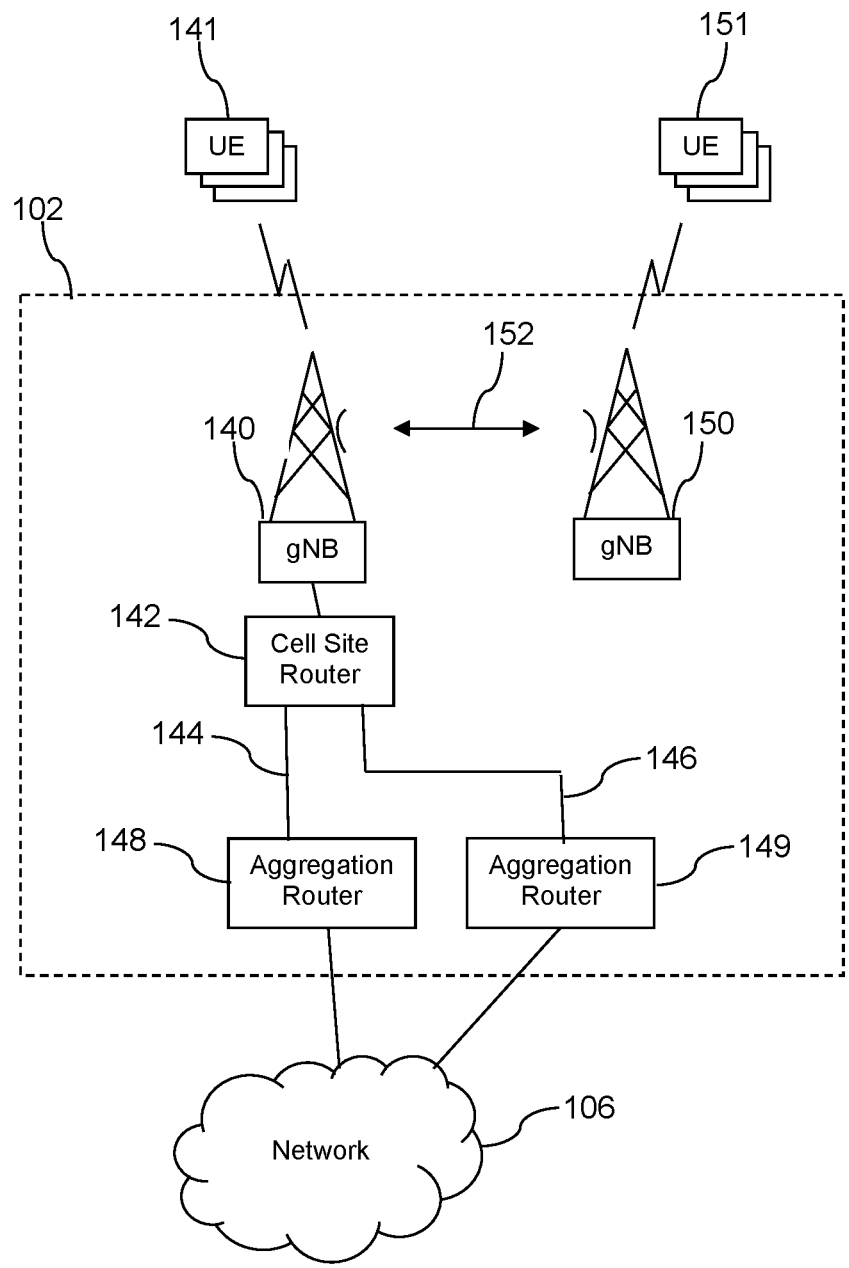
FIG. 2B is a block diagram of a second portion of a RAN according to an embodiment of the disclosure.

Turning now to FIG. 2B, a second backhaul communication link type of the RAN 102 is described. A second cell site 140 associated with a second cell site router 142 is communicatively coupled to the network 106 via the second cell site router 142, via a third backhaul circuit 144, and via a third aggregation router 148. The second cell site is also communicatively coupled to the network 106 via the second cell site router 142, via a third backhaul circuit 146, and via a fourth aggregation router 149. The second cell site 140 may provide wireless communication links to one or more UEs 141. The functionality and features of the second cell site 140, the second cell site router 142, the third and fourth backhaul circuits 144, 146, and the third and fourth aggregation routers 148, 149 are substantially similar to the functionality and features of corresponding items described above with reference to FIG. 2A. In FIG. 2B, however, a third cell site 150 that is not associated with its own cell site router and does not have a direct backhaul link to an aggregation router is depicted. In this configuration, a microwave communication link 152 may be established between the third cell site 150 and the second cell site 140. The third cell site 150 receives indirect backhaul service via the microwave communication link 152 and via the third and fourth backhaul circuits 144 and 146. The third cell site 150 may provide wireless communication links to UEs 151 in a manner similar to that of the first cell site 130 and the second cell site 140.

The second cell site 140 may be referred to in some contexts as a donor site in that it donates backhaul functionality to the third cell site 140. While not illustrated as such in FIG. 2B, in some embodiments, the third cell site 150 may establish a second microwave communication link to a second donor site that provides some backhaul redundancy for the third cell site 150 in case the second cell site 140, the second cell site router 142, or the backhaul circuits 144, 146 go out of service. The donated backhaul configuration of the third cell site 150 may be desirable in situations where the third cell site 150 is remotely located, for example located in mountainous terrain that is not easily reached by fiber optic communication lines.

Figure 3:
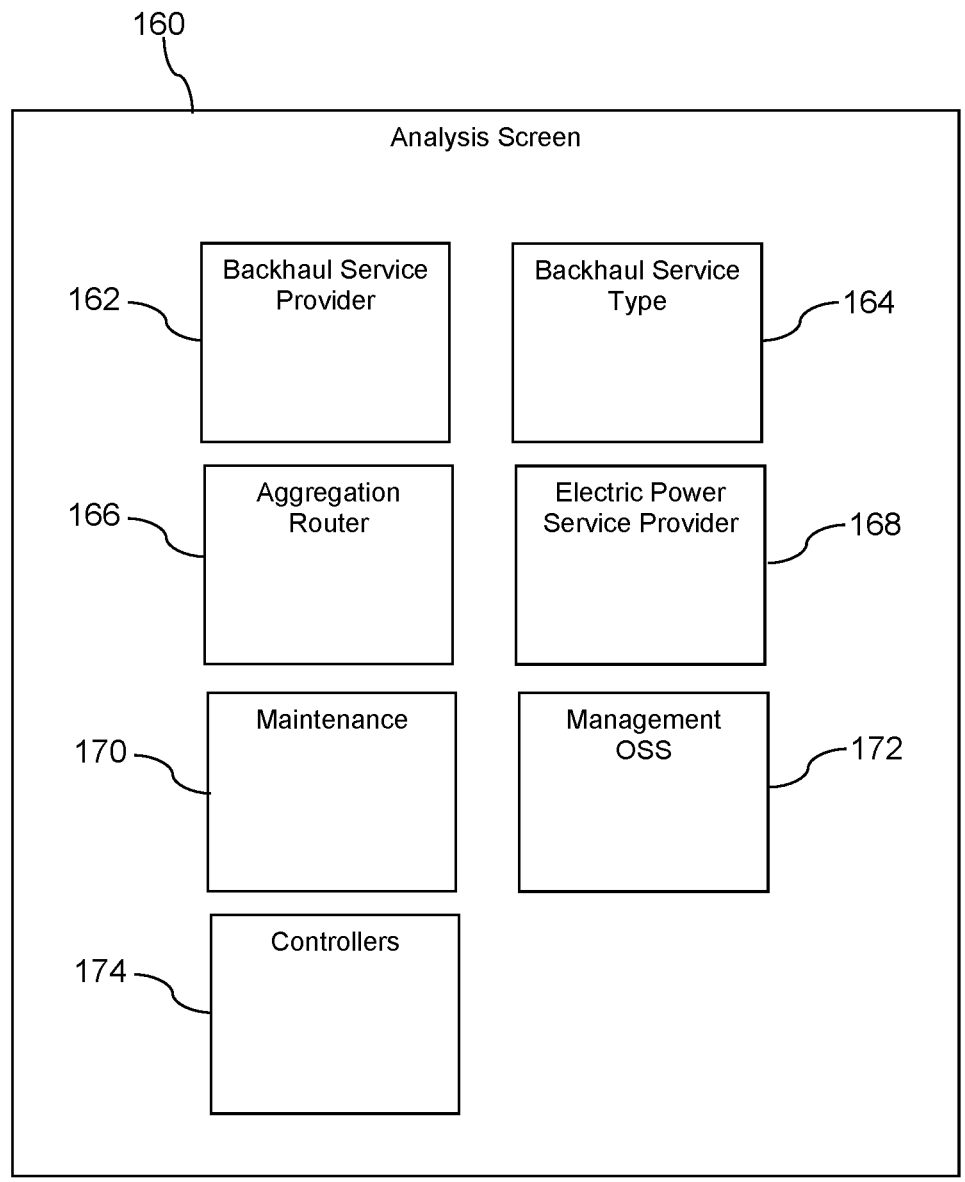
FIG. 3 is an illustration of a network management system (NMS) analysis user interface according to an embodiment of the disclosure.

Turning now to FIG. 3, an analysis screen 160 provided by the incident management application 114 and presented on a user interface (e.g., via the NOC dashboard) is described. In an embodiment, the analysis screen 160 may be reached from an LSE information screen, for example by clicking on an analysis button located within the LSE information screen. The analysis screen 160 provides presentation and control input facilities for analyzing an LSE (e.g., the LSE that was selected when viewing the LSE information screen). Data relevant to the LSE is collected by the incident management application 114 from a variety of different sources and marshaled and presented in sub-screens within the analysis screen 160. This can help a NOC technician to quickly determine a root cause of the LSE and to incorporate relevant data about the LSE in an incident report. The general approach is to look for commonalities across the presented data. Often a commonality in the presented data may reveal the root cause of the LSE. Sometimes a commonality among some of the data in combination with a differentiating contextual factor may reveal the root cause of the LSE.

A backhaul service provider sub-screen 162 of the analysis screen 160 presents a list of all backhaul service providers (i.e., AAVs) associated with cell sites affected by the LSE indicating how many of the affected cell sites are served by each listed backhaul service provider. If, for example, all of the backhaul facilities for all affected cell sites is provided by a single backhaul service provider, the root cause of the LSE may be a failure at the backhaul service provider. In an embodiment, a combination of (1) all of the backhaul facilities for all affected cell sites being provided by a common backhaul provider and (2) associations of the backhaul facilities with a plurality of different aggregation routers may reliably identify the root cause of the LSE as the common backhaul provider. By contrast, if condition 2 did not exist and instead a single aggregation router were associated with all of the backhaul facilities for all affected cell sites, it could be a failure of the aggregation router (e.g., a failed circuit card or a failed port of the aggregation router) OR the common backhaul provider that is the root cause of the LSE. In this case, further analysis would be desirable to determine a root cause of the LSE from these two candidate root causes. A backhaul service type sub-screen 164 provides information about backhaul service alarm types (e.g., simplex or total site outage). In an embodiment, the backhaul service type sub-screen 164 may indicate that a given backhaul circuit is a fiber circuit or is a microwave link.

Clicking on the name of a backhaul service provider in the backhaul service provider sub-screen 162 invokes a drill down to see detailed information about this backhaul service provider related to the LSE. A list of backhaul circuits provided by the selected backhaul service provider to cell sites affected by the LSE is presented. It is noted that it is helpful to the NOC technician to have the backhaul service provider filtered down to restrict the view of backhaul circuits to those associated with cell sites affected by the LSE and not ALL of the backhaul circuits the same backhaul service provider might provide over a vast area of the telecommunication service provider network that are not affected by the LSE. The drill down information on backhaul circuits comprises the identity of the backhaul service provider and the circuit IDs and names (e.g., VLAN names) the backhaul service provider has assigned to the backhaul circuits it provides. Contact information for backhaul service providers may be shown in the drill down information. This information can be selected using the analysis screen 160 and/or the backhaul service provider sub-screen by the NOC technician and inserted into the LSE incident report using a function of the analysis screen.

An aggregation router sub-screen 166 presents information about aggregation routers associated with the LSE. If alarms are active on the aggregation routers, clicking on the aggregation router representation (e.g., text identifying the aggregation router) provides a drill down function to obtain more details about the state of the subject aggregation router. This drill down information can include status of the aggregation router as a whole, status of circuit cards of the aggregation router, and status of ports on a circuit card of the aggregation router. This information can be selected using the analysis screen 160 and/or the aggregation router sub-screen 166 by the NOC technician and inserted into the LSE incident report using a function of the analysis screen 160.

An electric power service provider sub-screen 168 presents information about electric power service providers associated with cell sites affected by the LSE. The electric power service provider sub-screen 168 allows selecting the service provider and individual electrical services provided to affected cell sites. This information can identify electric power service identities assigned to each different cell site and an address associated to the cell site by the electric power service provider. This information can include contact information for the electric power service provider(s). This information can be selected using the analysis screen 160 and/or the electric power service provider sub-screen 168 by the NOC technician and inserted into the LSE incident report using a function of the analysis screen 160.

A maintenance sub-screen 170 presents information about current and recent maintenance on cell sites and other RAN equipment affected by the LSE. The maintenance information may include the list of cell sites that maintenance was performed on, when the maintenance started, when the maintenance ended, as well as what specific equipment and/or technologies were involved during the maintenance. The information presented in the maintenance sub-screen 170 may reveal commonality across cell sites and other RAN equipment affected by the LSE that points to a possible root cause of the LSE. A management OSS sub-screen 172 presents information about OSSs associated with cell sites affected by the LSE. The OSS screen might identify that all of the cell site equipment in alarm is managed by the same OSS platform and highlight that there may be communication problems between the cell sites and the OSS. The information presented in the management OSS sub-screen 172 may reveal commonality across cell sites and other RAN equipment affected by the LSE that points to a possible root cause of the LSE. A controllers sub-screen 174 presents information about controllers (e.g., BSCs and MSCs) associated with cell sites affected by the LSE. The controller sub-screen can identify which cell sites rely on which controller to provide communication services. If all of the sites in alarm leverage the same BSC, for example, and the alarms are associated with that technology, then a probable root cause may be a fault with the controller. The information presented in the controllers sub-screen 174 may reveal commonality across cell sites and other RAN equipment affected by the LSE that points to a possible root cause of the LSE.

It will be appreciated that the functionality of the analysis screen 160 and sub-screens 162, 164, 166, 168, 170, 172, and 174 may be provided by a component or process of the incident management application 114. The different sub-screens 162-174 may be likened to different views taken into the mass of data associated with an LSE. In the former process, a NOC technician would be confronted with the mass of data associated with the LSE and have to marshal this data to comprehend what it might reveal about the root cause of the LSE. Here, the incident management application 114 is providing the marshaling of data and providing alternative ways of viewing the data that supports rapid and reliable determination of a root cause of the LSE. Additionally, the incident management application 114 is promoting ease of lookup of supporting information and ease of incorporation of this looked-up information into the LSE incident report.

In an embodiment, the incident management application 114 can be configured to analyze the information and views presented in the analysis screen 160 and sub-screens 162-174 automatically, to identify a root cause of the LSE, to insert related information into the LSE incident report, and assign the LSE incident report to a responsible party for resolution. This can be very useful and can promote vendors handling their issues more timely. When reliable and comprehensive information is shared with vendors, it can help advance resolution promptly.

Figure 4:
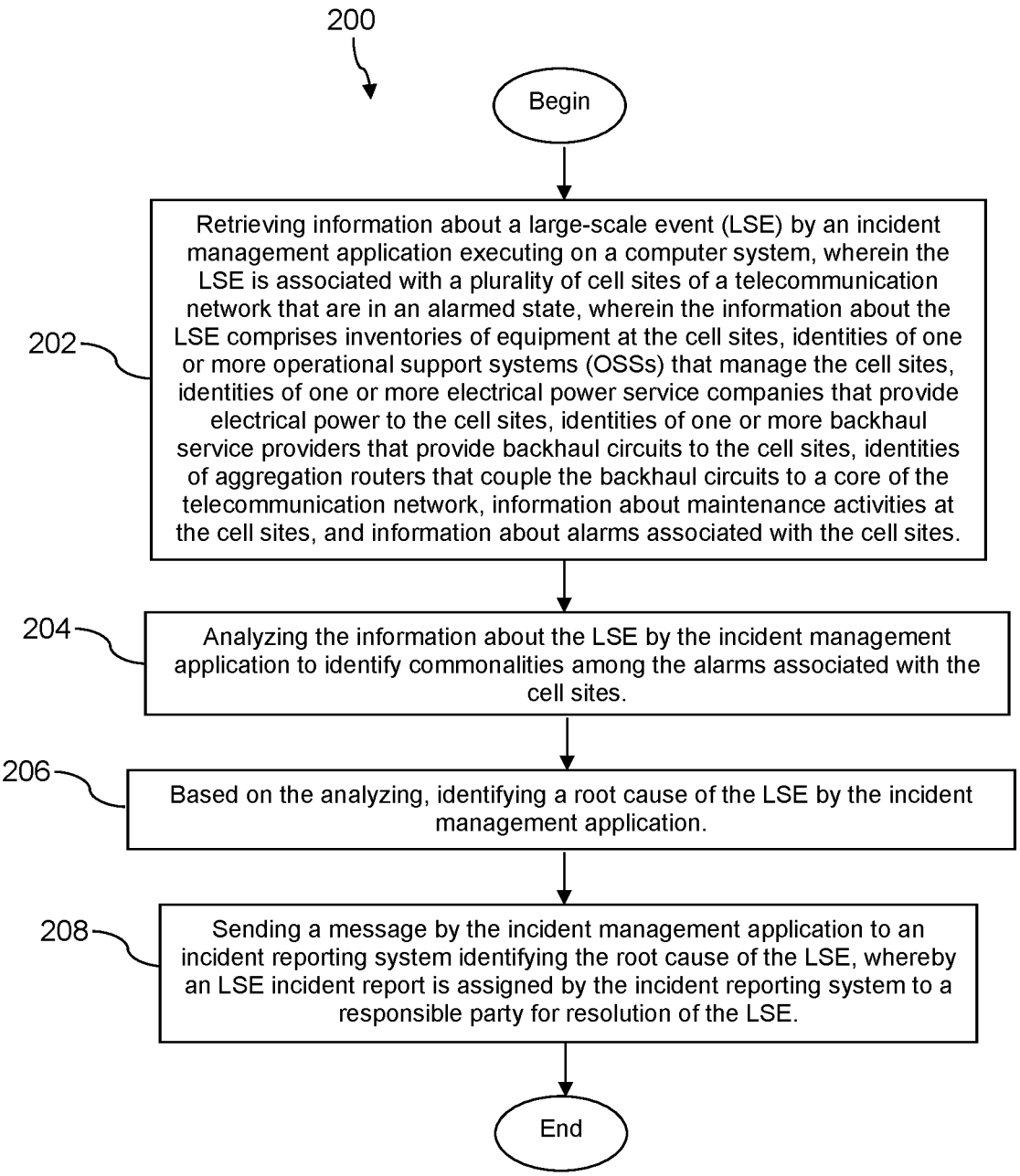
FIG. 4 is a flow chart of a first method according to an embodiment of the disclosure.

Turning now to FIG. 4, a method 200 is described. In an embodiment, the method 200 is a method of telecommunication network management. At block 202, the method 200 comprises retrieving information about a large-scale event (LSE) by an incident management application executing on a computer system, wherein the LSE is associated with a plurality of cell sites of a telecommunication network that are in an alarmed state, wherein the information about the LSE comprises inventories of equipment at the cell sites, identities of one or more operational support systems (OSSs) that manage the cell sites, identities of one or more electric power service companies that provide electric power to the cell sites, identities of one or more backhaul service providers that provide backhaul circuits to the cell sites, identities of aggregation routers that couple the backhaul circuits to a core of the telecommunication network, information about maintenance activities at the cell sites, and information about alarms associated with the cell sites. In an embodiment, the inventories of equipment at the cell sites comprises identities of components and sub-components of the cell sites, indications of hierarchical relationships among the components and sub-components of the cell sites, and indications of make, models, and revision levels of the components and sub-components of the cell sites. In an embodiment, the cell sites provide wireless communication links to user equipment according to a 5G, a long-term evolution (LTE), a code division multiple access (CDMA), and/or a global system for mobile communication (GSM) telecommunication protocol. It is understood that some cell sites may provide wireless communication links to different user equipment according to two or more different telecommunication protocols.

At block 204, the method 200 comprises analyzing the information about the LSE by the incident management application to identify commonalities among the alarms associated with the cell sites. In an embodiment, the commonalities among the alarms associated with the cell sites comprise at least 85% of the cell sites receiving backhaul service from a same alternate access vendor (AAV). In an embodiment, the commonalities among the alarms associated with the cell sites comprise at least 85% of the cell sites receiving electric power from a same electric power service provider. In an embodiment, the commonalities among the alarms associated with the cell sites comprise at least 85% of the cell sites receiving communication connectivity with a core network of the telecommunication network via a same aggregation router. In an embodiment, the commonalities among the alarms associated with the cell sites comprise at least 75% of the cell sites receiving backhaul service from a same alternate access vendor (AAV). In an embodiment, the commonalities among the alarms associated with the cell sites comprise at least 75% of the cell sites receiving electric power from a same electric power service provider. In an embodiment, the commonalities among the alarms associated with the cell sites comprise at least 75% of the cell sites receiving communication connectivity with a core network of the telecommunication network via a same aggregation router. In an embodiment, the commonalities among the alarms associated with the cell sites comprise at least 65% of the cell sites receiving backhaul service from a same alternate access vendor (AAV). In an embodiment, the commonalities among the alarms associated with the cell sites comprise at least 65% of the cell sites receiving electric power from a same electric power service provider. In an embodiment, the commonalities among the alarms associated with the cell sites comprise at least 65% of the cell sites receiving communication connectivity with a core network of the telecommunication network via a same aggregation router. In an embodiment, the commonalities among the alarms associated with the cell sites comprise at least 55% of the cell sites receiving backhaul service from a same alternate access vendor (AAV). In an embodiment, the commonalities among the alarms associated with the cell sites comprise at least 55% of the cell sites receiving electric power from a same electric power service provider. In an embodiment, the commonalities among the alarms associated with the cell sites comprise at least 55% of the cell sites receiving communication connectivity with a core network of the telecommunication network via a same aggregation router. In an embodiment, the threshold for determining commonality may depend upon other contextual factors, such as how many cell sites are associated with the LSE, what kinds of alarms are involved, as well as other factors.

At block 206, the method 200 comprises, based on the analyzing, identifying a root cause of the LSE by the incident management application. At block 208, the method 200 comprises sending a message by the incident management application to an incident reporting system identifying the root cause of the LSE, whereby an LSE incident report is assigned by the incident reporting system to a responsible party for resolution of the LSE. In an embodiment, the incident management application may invoke an application programming interface (API) of the incident reporting system to provide the root cause of the LSE and/or to provide supporting information about the LSE incident report such as backhaul circuit names (e.g., VLAN names), cell site addresses, electric power service account information.

Figure 5:
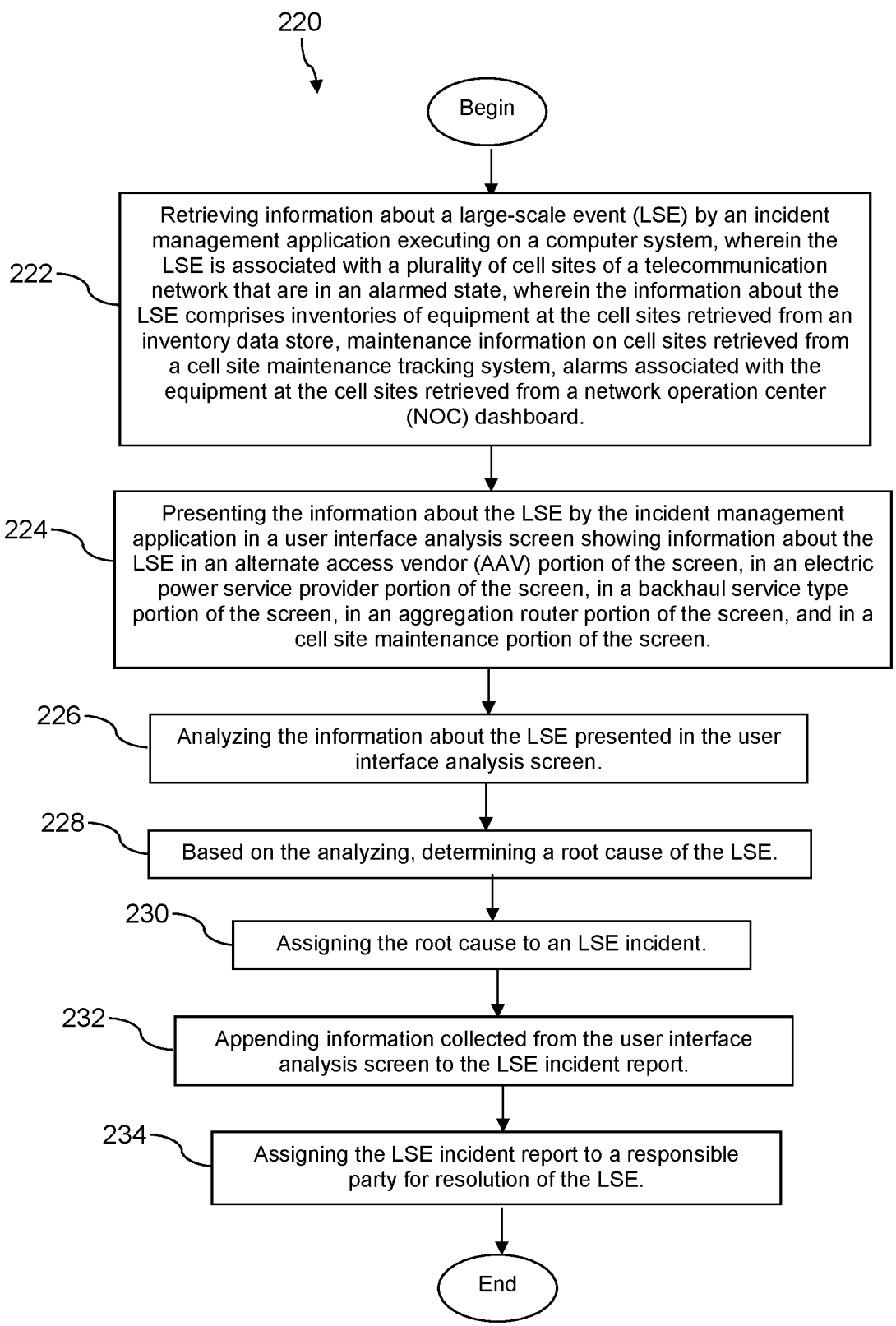
FIG. 5 is a flow chart of a second method according to an embodiment of the disclosure.

Turning now to FIG. 5, a method 220 is described. In an embodiment, the method 220 is a method of telecommunication network management. At block 222, the method 220 comprises retrieving information about a large-scale event (LSE) by an incident management application executing on a computer system, wherein the LSE is associated with a plurality of cell sites of a telecommunication network that are in an alarmed state, wherein the information about the LSE comprises inventories of equipment at the cell sites retrieved from an inventory data store, maintenance information on cell sites retrieved from a cell site maintenance tracking system, alarms associated with the equipment at the cell sites retrieved from a network operation center (NOC) dashboard. In an embodiment, the inventories of equipment at the cell sites comprises identities of components and sub-components of the cell sites, indications of hierarchical relationships among the components and sub-components of the cell sites, and indications of make, models, and revision levels of the components and sub-components of the cell sites.

At block 224, the method 220 comprises presenting the information about the LSE by the incident management application in a user interface analysis screen showing information about the LSE in an alternate access vendor (AAV) portion of the screen, in an electric power service provider portion of the screen, in a backhaul service type portion of the screen, in an aggregation router portion of the screen, and in a cell site maintenance portion of the screen. At block 226, the method 220 comprises analyzing the information about the LSE presented in the user interface analysis screen.

At block 228, the method 220 comprises, based on the analyzing, determining a root cause of the LSE. At block 230, the method 220 comprises assigning the root cause to an LSE incident report.

At block 232, the method 220 comprises appending information collected from the user interface analysis screen to the LSE incident report. At block 234, the method 220 comprises assigning the LSE incident report to a responsible party for resolution of the LSE.

In an embodiment, the processing of blocks 226 through 234 is performed by the incident management application. In another embodiment, at least some of the processing of blocks 226 through 234 is performed by user, for example by a NOC technician. In an embodiment, clicking on information about an electric power service provider in the electric power service provider portion of the screen (e.g., a user clicking) provides a drill-down view of electric power services provided to the cell sites including addresses associated to the cell sites and contact information for reaching out to the subject electric power service providers. In an embodiment, clicking on information about an AAV in the AAV portion of the screen (e.g., a user clicking) provides a drill-down view of backhaul circuits provided by AAVs to the cell sites including circuit names given to the backhaul circuits by the AAVs and contact information for reaching out to the subject AAVs. In an embodiment, a user assigns the root cause to the LSE incident report using an interface provided by an incident reporting system. In an embodiment, the user appends information collected from the user interface analysis screen to the LSE incident report using the interface provided by the incident reporting system. In an embodiment, the user assigns the LSE incident report to the responsible party for resolution using the interface provided by the incident reporting system.

Figure 6A:
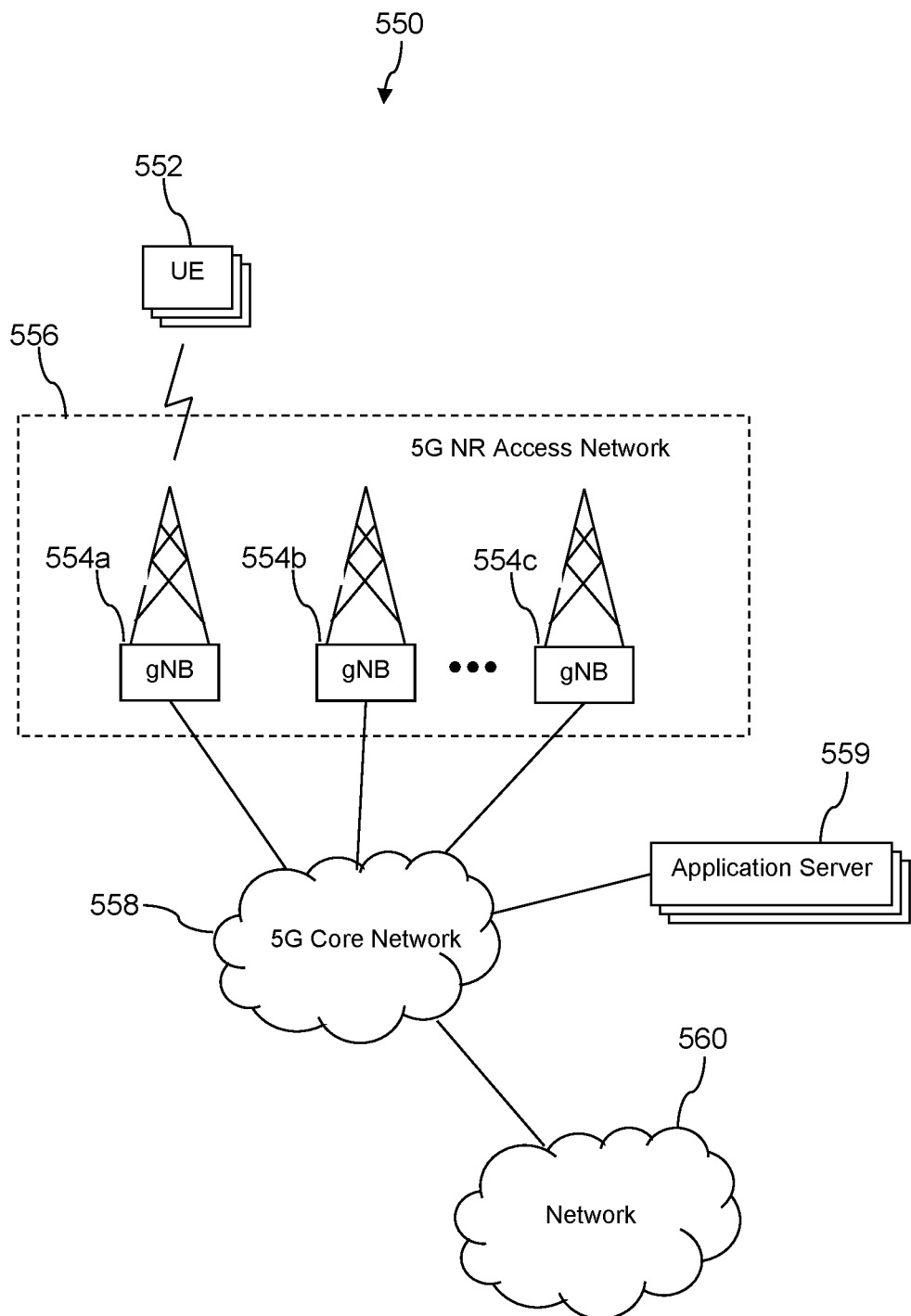
FIG. 6A and FIG. 6B are block diagrams of an aspect of a telecommunication network according to an embodiment of the disclosure.

Turning now to FIG. 6A, an exemplary communication system 550 is described. Typically, the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next Generation Node B (gNB). In 4G technology (e.g., long-term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554*a*, a second access node 554*b*, and a third access node 554*c*. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"— such as Long-Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 6B:
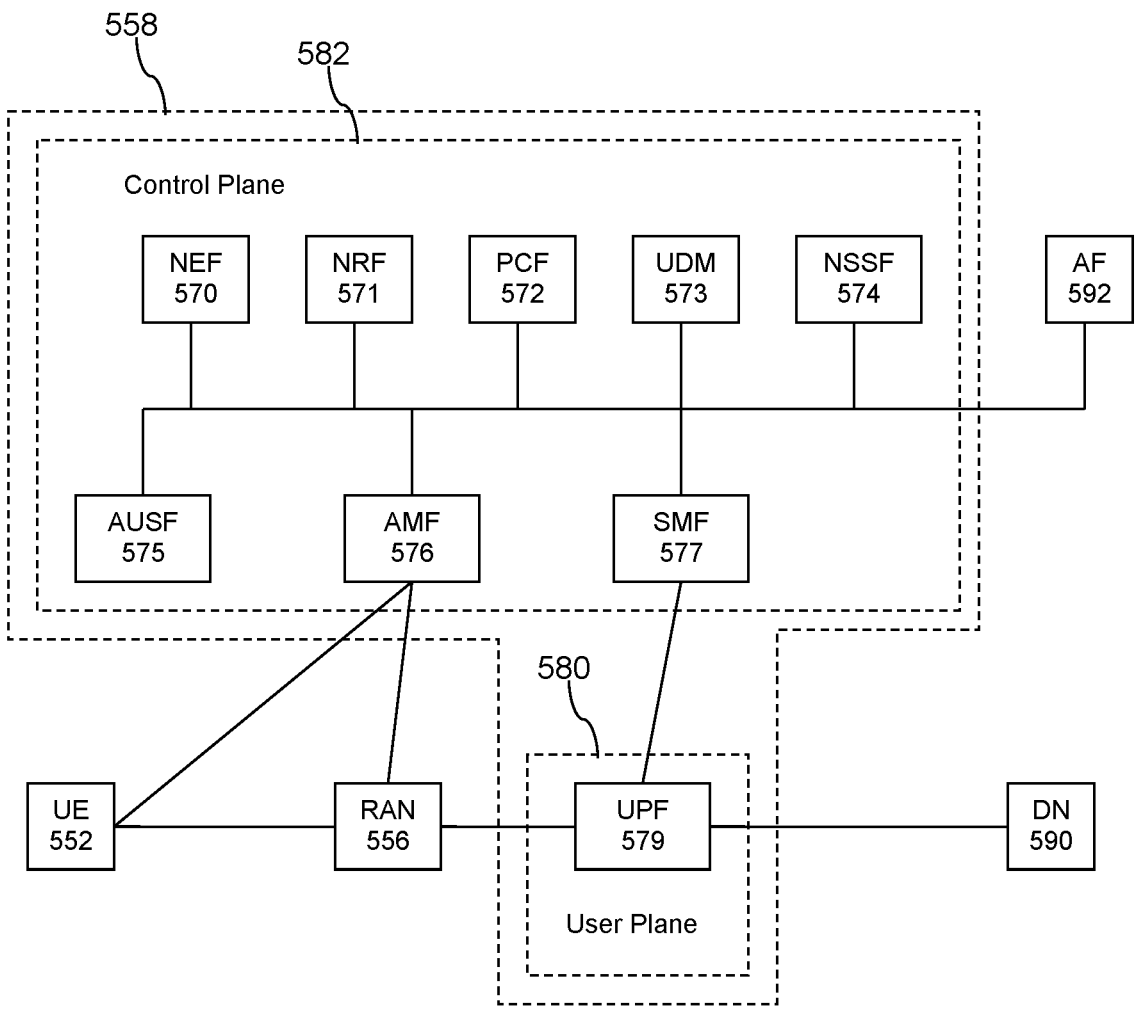

Turning now to FIG. 6B, further details of the core network 558 are described. In an embodiment, the core network 558 is a 5G core network. 5G core network technology is based on a service-based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF)

574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 6A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow-based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 7:
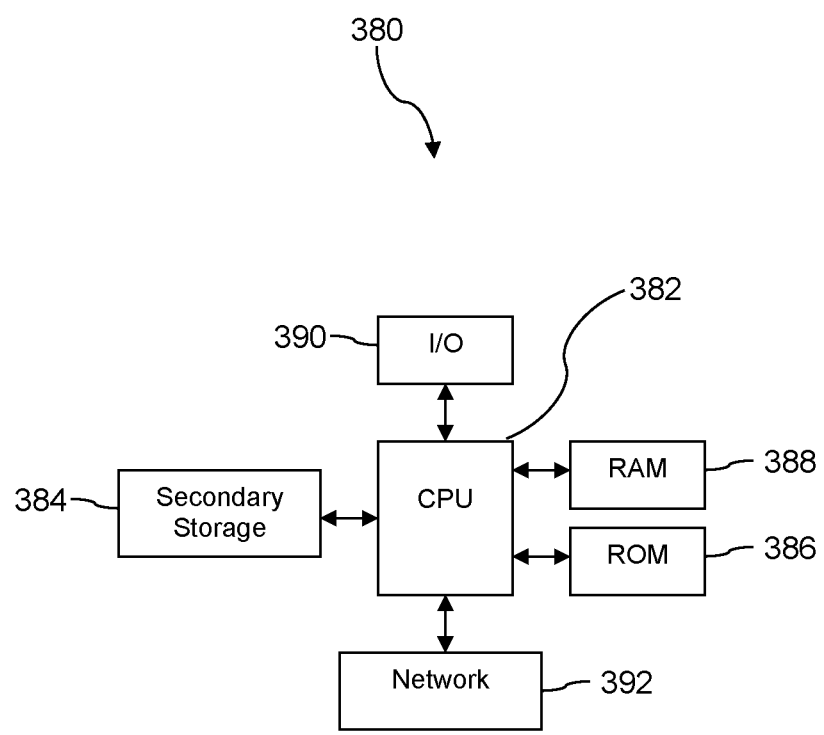
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electric power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of telecommunication network management, comprising:
    retrieving information about a large-scale event (LSE) by an incident management application executing on a computer system, wherein the LSE is associated with a plurality of cell sites of a telecommunication network that are in an alarmed state, wherein the information about the LSE comprises inventories of equipment at the cell sites, identities of one or more operational support systems (OSSs) that manage the cell sites, identities of one or more electric power service companies that provide electric power to the cell sites, identities of one or more backhaul service providers that provide backhaul circuits to the cell sites, identities of aggregation routers that couple the backhaul circuits to a core of the telecommunication network, information about maintenance activities at the cell sites, and information about alarms associated with the cell sites;
    analyzing the information about the LSE by the incident management application to identify commonalities among the alarms associated with the cell sites;
    based on the analyzing, identifying a root cause of the LSE by the incident management application; and
    sending a message by the incident management application to an incident reporting system identifying the root cause of the LSE, whereby an LSE incident report is assigned by the incident reporting system to a responsible party for resolution of the LSE.

2. The method of claim 1, wherein the inventories of equipment at the cell sites comprises identities of components and sub-components of the cell sites, indications of hierarchical relationships among the components and sub-components of the cell sites, and indications of make, models, and revision levels of the components and sub-components of the cell sites.

3. The method of claim 1, wherein the commonalities among the alarms associated with the cell sites comprise at least 75% of the cell sites receiving backhaul service from a same alternate access vendor (AAV).

4. The method of claim 1, wherein the commonalities among the alarms associated with the cell sites comprise at least 75% of the cell sites receiving electric power from a same electric power service provider.

5. The method of claim 1, wherein the commonalities among the alarms associated with the cell sites comprise at least 75% of the cell sites receiving communication connectivity with a core network of the telecommunication network via a same aggregation router.

6. The method of claim 1, wherein the cell sites provide wireless communication links to user equipment according to a 5G, a long-term evolution (LTE), a code division multiple access (CDMA), or a global system for mobile communication (GSM) telecommunication protocol.

7. A telecommunication network management system, comprising:
    an incident reporting application executing on a first computer system, wherein the incident reporting application creates incident reports pursuant to alarms on network elements of a telecommunication network, wherein one of the incident reports is an LSE incident report that is associated with a large-scale event (LSE), and wherein the LSE incident report identifies alarms at a plurality of different network elements as associated with the LSE; and
    an incident management application that executes on a second computer system, wherein the incident management application analyzes attributes of cell sites identified in the LSE incident report as affected by the LSE, determines that at least 75% of the cell sites receive backhaul service from a same alternative access vendor (AAV) and that at least one backhaul circuit of the at least 75% of the cell sites affected by the LSE is in an alarmed state, and causes the incident reporting application to record a root cause of the LSE incident report as an AAV fault,
    wherein the attributes of cell sites comprise cell site equipment identities, relationships among cell site equipment, alarm state of cell site equipment, identities of operational support systems (OSSs) associated to the cell sites, identities of electric power service providers that provide electric power to the cell sites, and identities of AAVs that provide backhaul circuits to the cell sites, wherein the incident reporting application or the incident management application sends a notification to the AAV to restore their backhaul circuits that are in the alarmed state, and wherein the notification identifies cell sites affected by the backhaul circuits in the alarmed state and identifies the backhaul circuits of the AAV in the alarmed state.

8. The system of claim 7, wherein the network elements comprise a plurality of cell sites.

9. The system of claim 7, wherein the LSE involves at least six different network elements that are within a predefined proximity of each other and that have similar alarms that were raised within about fifteen minutes of each other.

10. The system of claim 7, wherein the incident management application determines that the cell sites receiving backhaul service from the AAV deemed to be the root cause of the LSE are associated with at least two different aggregation routers.

11. The system of claim 7, wherein a different one of incident reports is a second LSE incident report that is associated with a second LSE and wherein the incident management application analyzes attributes of cell sites identified in the second LSE incident report as affected by the second LSE, determines that at least 75% of the cell sites affected by the second LSE receive electric power from a same electric power service provider, and causes the incident reporting application to record a root cause of the second incident report as an electric power service provider fault.

12. The system of claim 11, wherein the incident reporting application or the incident management application sends a notification to the electric power service provider to restore power to the cell sites affected by the second LSE, wherein the notification identifies the cell sites affected by the second LSE, identifies a service address of the cell sites affected by the second LSE, and identifies the electric service accounts of the cell sites affected by the second LSE.

* * * * *